(12) United States Patent
Kosuda et al.

(10) Patent No.: US 8,213,279 B2
(45) Date of Patent: Jul. 3, 2012

(54) OPTICAL RECORDING MEDIUM AND OPTICAL RECORDING-READING METHOD

(75) Inventors: Atsuko Kosuda, Tokyo (JP); Motohiro Inoue, Tokyo (JP); Takashi Kikukawa, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/032,242

(22) Filed: Feb. 22, 2011

(65) Prior Publication Data

US 2011/0205870 A1 Aug. 25, 2011

(30) Foreign Application Priority Data

Feb. 22, 2010 (JP) ................................ 2010-035811

(51) Int. Cl.
*G11B 7/00* (2006.01)
(52) U.S. Cl. ...................... 369/44.37; 369/94; 369/53.23
(58) Field of Classification Search .................... 369/94, 369/44.27, 44.26, 275.1, 275.2, 275.3, 275.4, 369/44.37, 53.23, 53.28
See application file for complete search history.

(56) References Cited

U.S. PATENT DOCUMENTS

| 7,944,797 B2* | 5/2011 | Ogasawara | 369/103 |
| 2009/0316543 A1* | 12/2009 | Hayashibe et al. | 369/47.15 |
| 2010/0309759 A1* | 12/2010 | Sato et al. | 369/44.26 |
| 2011/0075545 A1* | 3/2011 | Nagatomi et al. | 369/112.23 |

FOREIGN PATENT DOCUMENTS

| JP | 2002063738 A | 2/2002 |
| JP | 2008097694 A | 4/2008 |
| JP | 2009104717 A | 5/2009 |

OTHER PUBLICATIONS

Ichimura et al., "Proposal for a Multilayer Read-Only-Memory Optical Disc Structure", Applied Optics 45 (8):1794-1803 (2006).
Mishima et al., "150 GB, 6-Layer Write Once Disc for Blu Ray Disc System", Proc. of SPIE 6282 628201-1-628201-11 (2006).

* cited by examiner

*Primary Examiner* — Nabil Hindi
(74) *Attorney, Agent, or Firm* — Porzio, Bromberg & Newman, P.C.

(57) ABSTRACT

An optical recording medium including recording and reading layers and a servo layer increases the recording capacity thereof. In the optical recording medium including the plurality of recording and reading layers and the servo layer, the servo layer has a groove and a land that can be used to perform tracking control with a long-wavelength servo beam. Information is recorded on the recording and reading layers with a recording and reading beam having a wavelength shorter than the wavelength of the servo beam. Recording marks are formed on the recording and reading layers while both the groove and land are tracked.

20 Claims, 4 Drawing Sheets

OPTICAL RECORDING MEDIUM AND OPTICAL RECORDING-READING METHOD

BACKGROUND OF THE INVENTION

1. Field of the Invention

The present invention relates to an optical recording medium including a plurality of recording and reading layers, and an optical recording-reading method of recording on the optical recording medium.

2. Description of the Related Art

Conventionally, optical recording media such as CD-DAs, CD-ROMs, CD-Rs, CD-RWs, DVD-ROMs, DVD-Rs, DVD+/−RWs, DVD-RAMs, Blu-ray Discs (BD) are widely used to view digital video contents and to record digital data. In the BD standard, which is one of the next generation DVD standards, the wavelength of the laser beam used for recording and reading is reduced to 405 nm, and the numerical aperture of an objective lens is set to 0.85. In optical recording media conforming to the BD standard, tracks are formed at 0.32 μm pitch. This enables 25 GB or more data to be recorded on and read from one recording and reading layer of such an optical recording medium.

It is expected that the size of video and data files will increase more and more in the future. Therefore, it is contemplated to increase the capacities of optical recording media by using a multiple stack of recording and reading layers. In the technologies for BD standard optical recording media reported by I. Ichimura et al., Appl. Opt., 45, 1974-1803 (2006) and K. Mishima et al., Proc. of SPIE, 6282, 628201 (2006), 6 to 8 recording and reading layers are provided to achieve ultra large capacities as much as 200 GB.

When a multiple stack of recording and reading layers is used in an optical recording medium, projections and depressions, such as grooves and lands, for tracking control are formed on each recording and reading layer, and therefore a stamper (a master die) must be used to form the projections and depressions each time a recording and reading layer is formed. Therefore, as the number of stacked layers increases, the number of times the stamper is used increases, and this may result in an increase in manufacturing cost.

In the technologies for optical recording media recently proposed in Japanese Patent Application Laid-Open Nos. 2002-63738, 2008-97694, and 2009-104717, a servo layer is provided separately from recording and reading layers, and information is recorded on each recording and reading layer using a recording laser beam while a tracking signal is obtained from the servo layer using a servo laser beam. With such technologies, the recording and reading layers need not have projections and depressions (grooves) for tracking information, and a stamper need not be used for the recording and reading layers during manufacturing. This enables a significant reduction in cost.

One problem with the optical recording media described in Japanese Patent Application Laid-Open Nos. 2002-63738, 2008-97694, and 2009-104717 is that, to increase the recording capacity of the recording and reading layers, the track pitch of each servo layer must be reduced.

For example, in the structure of the optical recording medium in Japanese Patent Application Laid-Open No. 2008-97694, two laser beams of the same type are used to irradiate a servo layer and recording and reading layers, respectively, and accordingly, the track pitch of the servo layer coincides with the track pitch of the recording and reading layers. However, this causes the problem in that the recording capacity of the recording and reading layers is restricted by the track pitch of the servo layer.

For example, in the optical recording medium described in Japanese Patent Application Laid-Open No. 2009-104717, the wavelength of the laser beam used to irradiate a servo layer is different from the wavelength of the laser beam used to irradiate recording and reading layers. The recording capacity of the recording and reading layers is restricted by the larger one of the spots projected onto the servo layer and the recording and reading layers. Therefore, although the laser beams with different wavelengths are used, the optical systems in an optical pickup are designed such that the spots of the laser beams have the same diameter. However, the problem still remains that the recording capacity of the recording and reading layers is restricted by the track pitch of the servo layer.

SUMMARY OF THE INVENTION

The present invention has been made in view of the above problems, and it is an object of the invention to provide a technique that is used for an optical recording medium including a servo layer and recording and reading layers to increase the recording capacity of the recording and reading layers by a simple structure.

The present inventors have made extensive studies, and the above object is achieved by the following means.

To achieve the above object, the present invention provides an optical recording medium including: a plurality of recording and reading layers having a flat structure with no projection and depression for tracking control; and a servo layer having a groove and a land for tracking control formed thereon, wherein: information is recorded on the plurality of recording and reading layers while tracking control is performed using the servo layer; the groove and the land on the servo layer can be tracking-controlled with a long-wavelength servo beam, the information is allowed to be recorded on the plurality of recording and reading layers with a recording and reading beam having a wavelength shorter than a wavelength of the servo beam; and wherein a track pitch of recording marks formed on the plurality of recording and reading layers coincides with a pitch between the groove and the land on the servo layer.

In the optical recording medium provided to achieve the above object, the servo layer is disposed farther from a light incident surface of the optical recording medium than the plurality of recording and reading layers, and the recording and reading layers have properties that allow transmission of the servo beam.

In the optical recording medium provided to achieve the above object, the servo layer is disposed closer to a light incident surface of the optical recording medium than the plurality of recording and reading layers and has properties that allow transmission of the recording and reading beam.

In the optical recording medium provided to achieve the above object, a wavelength of the servo beam is in the range of 630 nm to 680 nm, and a wavelength of the recording and reading beam is in the range of 380 nm to 450 nm.

In the optical recording medium provided to achieve the above object, a pitch between adjacent sections of the groove or a pitch between adjacent sections of the land is less than 0.74 μm, and the track pitch of the recording marks formed on the plurality of recording and reading layers is less than 0.37 μm.

In the optical recording medium provided to achieve the above object, the pitch between the adjacent sections of the groove or the pitch between the adjacent sections of the land is in the range of 0.6 μm to 0.7 μm, and the track pitch of the recording marks formed on the plurality of recording and reading layers is in the range of 0.30 µm to 0.35 µm.

In the optical recording medium provided to achieve the above object, the servo layer is disposed at a distance less than 0.6 mm from the light incident surface.

In the optical recording medium provided to achieve the above object, the servo layer is disposed at a distance less than 0.4 mm from the light incident surface.

In the optical recording medium provided to achieve the above object, an interlayer distance between the servo layer and a recording and reading layer that is adjacent to the servo layer among the plurality of recording and reading layers is equal to any one of interlayer distances between the plurality of recording and reading layers.

In the optical recording medium provided to achieve the above object, the recording and reading layers include six or more recording and reading layers.

In the optical recording medium provided to achieve the above object, the interlayer distances between the plurality of recording and reading layers are set alternately to a first distance and a second distance different from the first distance.

To achieve the above object, the present invention provides an optical recording and reading method of recording information on an optical recording medium, the optical recording medium including a plurality of recording and reading layers having a flat structure with no projection and depression for tracking control and a servo layer having a groove and a land for tracking control formed thereon, the method including: forming recording marks on the plurality of recording and reading layers with a recording and reading beam having a wavelength shorter than a wavelength of the servo beam while tracking control is performed using both the groove and the land on the servo layer that are tracked with a long-wavelength servo beam, so that a track pitch of the recording marks coincides with a pitch between the groove and the land.

In the optical recording and reading method provided to achieve the above object, when reading is performed by irradiating the recording marks with the recording and reading beam, tracking control is performed using reflected light of the recording and reading beam.

In the optical recording and reading method provided to achieve the above object, the servo layer is disposed farther from a light incident surface of the optical recording medium than the plurality of recording and reading layers, and the plurality of recording and reading layers have properties that allow transmission of the servo beam. The servo layer is irradiated with the servo beam passing through the plurality of recording and reading layers to perform tracking control.

In the optical recording and reading method provided to achieve the above object, the servo layer is disposed closer to a light incident surface of the optical recording medium than the plurality of recording and reading layers and has properties that allow transmission of the recording and reading beam. Each of the plurality of recording and reading layers is irradiated with the recording and reading beam passing through the servo layer to perform recording or reading.

In the optical recording and reading method provided to achieve the above object, a wavelength of the servo beam is in the range of 630 nm to 680 nm, and a wavelength of the recording and reading beam is in the range of 380 nm to 450 nm.

In the optical recording and reading method provided to achieve the above object, a pitch between adjacent sections of the groove or a pitch between adjacent sections of the land is set to less than 0.74 µm, so that the track pitch of the recording marks formed on the plurality of recording and reading layers is set to less than 0.37 µm.

In the optical recording and reading method provided to achieve the above object, the pitch between the adjacent sections of the groove or the pitch between the adjacent sections of the land is set in the range of 0.6 µm to 0.7 µm, so that the track pitch of the recording marks is set in the range of 0.3 µm to 0.35 µm.

In the optical recording and reading method provided to achieve the above object, information is recorded on the servo layer with the recording and reading beam.

In the optical recording and reading method provided to achieve the above object, the servo layer is disposed at a distance less than 0.4 mm from a light incident surface of the optical recording medium.

According to the present invention, the recording capacity of the recording and reading layers can be increased without reducing the track pitch in the servo layer.

DETAILED DESCRIPTION OF THE PREFERRED EMBODIMENTS

Preferred embodiments of the present invention will next be described with reference to the accompanying drawings.

Figure 1:
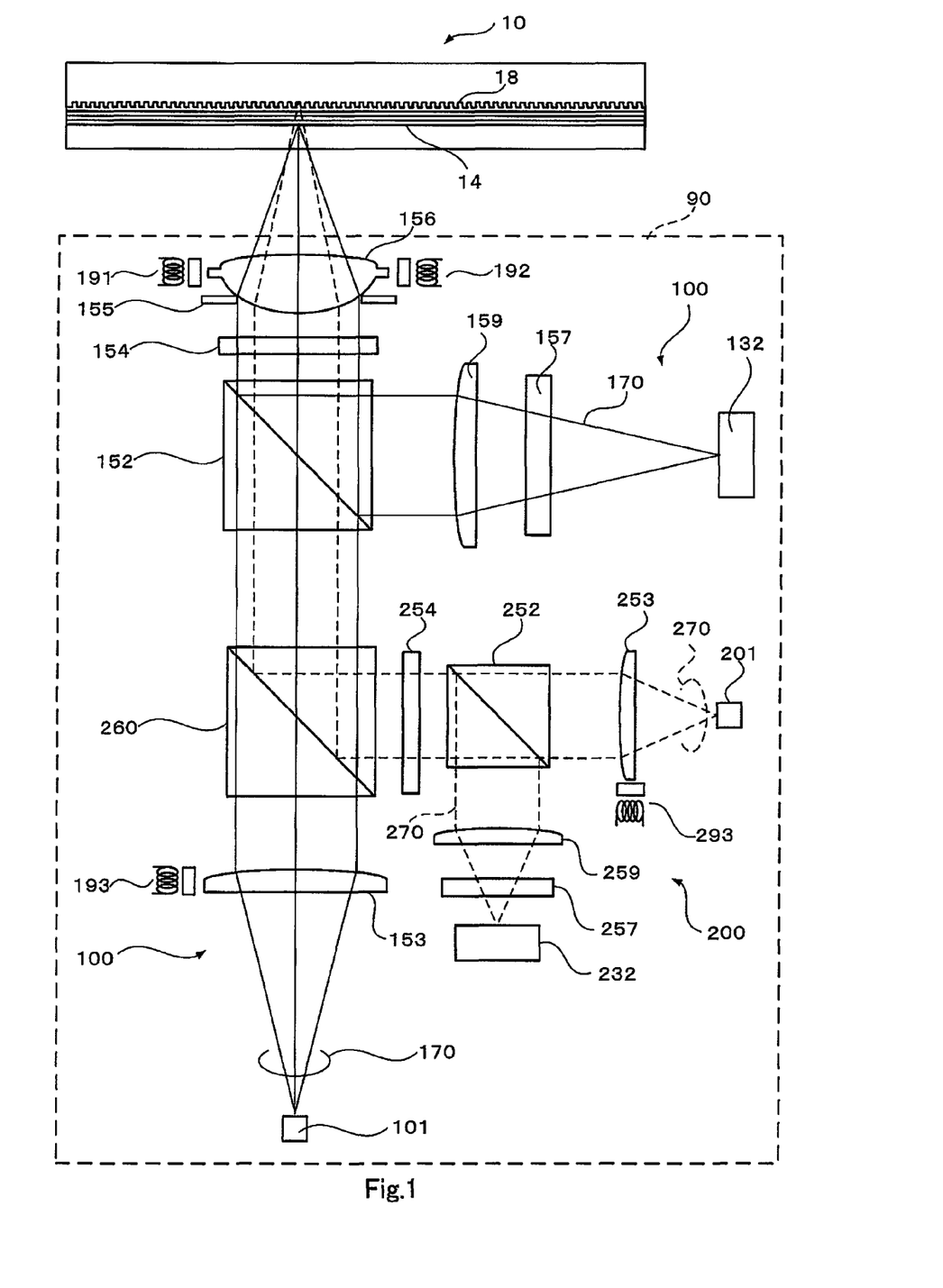
FIG. 1 is a block diagram illustrating the structure of an optical pickup used to record and read an optical recording medium according to an embodiment of the present invention.

FIG. 1 shows the structure of an optical recording medium 10 according to an embodiment and the structure of an optical pickup 90 used to record and read the optical recording medium 10. The optical pickup 90 includes a first optical system 100 and a second optical system 200. The first optical system 100 is used to record and read a recording and reading layer group 14 in the optical recording medium 10. The second optical system 200 is used for tracking control using a servo layer 18 (described later) when information is recorded on the recording and reading layer group 14 using the first optical system 100.

A diverging beam 170 emitted from a light source 101 of the first optical system 100 and having a relatively short blue wavelength (380 to 450 nm, 405 nm in this optical pickup) passes through a collimating lens 153 provided with spherical aberration correction means 193 and through a wavelength selection filter 260 of the second optical system 200 and enters a polarizing beam splitter 152. The beam 170 entering the polarizing beam splitter 152 passes therethrough and then through a ¼ wavelength plate 154 and is thereby converted to a circularly polarized beam. The circularly polarized beam is then converted to a converging beam through an objective lens 156. The resultant beam 170 is focused on one of a plurality of recording and reading layers in the recording and reading layer group 14 formed in the optical recording medium 10.

The aperture of the objective lens 156 is restricted by an aperture stop 155 to set the numerical aperture NA to 0.70 to 0.90 (0.85 in this optical pickup). The beam 170 reflected from, for example, the recording and reading layer group 14 passes through the objective lens 156 and then through the ¼ wavelength plate 154 and is thereby converted to a linearly polarized beam with the polarization plane rotated 90° relative to that in the outward path. Then, the resultant beam is reflected from the polarizing beam splitter 152. The polarizing beam splitter 152 has wavelength selectivity. More specifically, the polarizing beam splitter 152 allows the beam 170 from the light source 101 of the first optical system 100 to be reflected therefrom but always transmits a beam 270 (described later) emitted from the second optical system 200 and having a relatively long red wavelength.

The beam 170 reflected from the polarizing beam splitter 152 passes through a condensing lens 159 and is thereby converted to a converging beam. The converging beam passes through a cylindrical lens 157 and is incident on a photodetector 132. When the beam 170 passes through the cylindrical lens 157, astigmatism is given to the beam 170.

The photodetector 132 has four light receiving units (not shown), and each of the light receiving units outputs a current signal according to the amount of light received. The current signals are used to generate a focus error (hereinafter abbreviated as FE) signal using the astigmatic method, a tracking error (hereinafter abbreviated as TE) signal using the push-pull method (the TE signal is generated only during reading), a reading signal of information recorded on the optical recording medium 10, and other signals. The FE and TE signals are amplified to desired levels, subjected to phase compensation, and then supplied to actuators 191 and 192 as feedback to perform focus control and tracking control. The tracking control by the first optical system 100 is used only for reading.

The diverging beam 270 emitted from a light source 201 of the second optical system 200 and having a red wavelength of 630 to 680 nm (650 nm in this optical pickup) passes through a collimating lens 253 provided with spherical aberration correction means 293 and enters a polarizing beam splitter 252. The beam 270 entering the polarizing beam splitter 252 passes therethrough and then through a ¼ wavelength plate 254 for the second optical system and is thereby converted to a circularly polarized beam. The circularly polarized beam is reflected from the wavelength selection filter 260 and passes through the polarizing beam splitter 152, which is shared with the first optical system 100. The beam 270 is then converted to a converging beam through the objective lens 156. The resultant beam 270 is focused on the servo layer 18 formed in the first optical recording medium 10. The beam 270 reflected from the servo layer 18 passes through the objective lens 156 and then through the polarizing beam splitter 152 and is reflected from the wavelength selection filter 260 of the second optical system 200. The reflected beam 270 passes through the ¼ wavelength plate 254 and is thereby converted to a linearly polarized beam with the polarization plane rotated 90° relative to that in the outward path. Then, the resultant beam is reflected from the polarizing beam splitter 252. The beam 270 reflected from the polarizing beam splitter 252 passes through a condensing lens 259 and is thereby converted to a converging beam. The converging beam passes through a cylindrical lens 257 and is then incident on a photodetector 232. When the beam 270 passes through the cylindrical lens 257, astigmatism is given to the beam 270.

The photodetector 232 has four light receiving units (not shown), and each of the light receiving units outputs a current signal according to the amount of light received. The current signals are used to generate a focus error (FE) signal using the astigmatic method and a tracking error (TE) signal using the push-pull method. If information is recorded also on the servo layer 18, a reading signal is also generated.

When information is recorded on the recording and reading layer group 14 using the first optical system 100, the TE signal from the second optical system 200 is amplified to a desired level, subjected to phase compensation, and then supplied to the actuators 191 and 192 as feedback to perform tracking control. Therefore, the first optical system 100 records information on the recording and reading layer group 14 under the tracking control by the second optical system 200. In the present embodiment, when information recorded on the recording and reading layer group 14 is read, the first optical system 100 itself performs tracking control using recording marks on the recording and reading layer group 14. Of course, the information can be read under tracking control by the second optical system 200.

Figure 2:
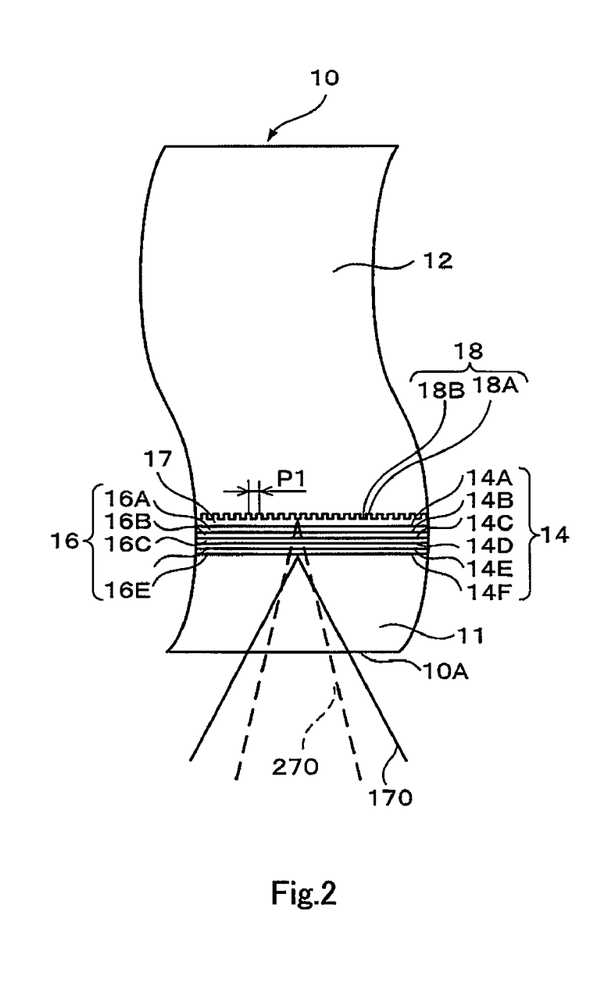
FIG. 2 is a cross-sectional view illustrating the stacking structure of the optical recording medium.

FIG. 2 shows the enlarged cross-sectional structure of the first optical recording medium 10 according to the present embodiment.

The optical recording medium 10 has a disc shape having an outer diameter of approximately 120 mm and a thickness of approximately 1.2 mm. The optical recording medium 10 includes, in order from a light incident surface 10A, a cover layer 11, the recording and reading layer group 14, an intermediate layer group 16, a spacer layer 17, the servo layer 18, and a support substrate 12.

In this embodiment, the recording and reading layer group 14 includes first to sixth recording and reading layers 14A to 14F, and information can be recorded on each recording and reading layer. Each of the first to sixth recording and reading layers 14A to 14F has a flat structure with no projection and depression for tracking control. When any of the first to sixth recording and reading layers 14A to 14F is irradiated with the high-energy recording beam 170 emitted from the first optical system 100, recording marks are formed. The types of the recording and reading layers in the recording and reading layer group 14 include a write-once type in which information can be additionally written but the written information is not rewritable and a rewritable type in which information is rewritable.

The support substrate 12 is a disc-shaped substrate having a diameter of 120 mm and a thickness of 1.0 mm, which is employed to ensure the thickness required for the optical recording medium (about 1.2 mm). The servo layer 18 is formed on a surface of the support substrate 12 that is on the side toward the light incident surface 10A. More specifically, a spiral land 18A and a spiral groove 18B are formed on the support substrate 12 on the side toward the light incident surface 10A so as to extend from the vicinity of its center toward its outer edge. The land 18A and groove 18B serve as a projection and a depression (recess) for tracking control, and the beam 270 from the second optical system 200 is guided by them.

Various materials can be used as the material for the support substrate 12. For example, glass, ceramic, and resin can be used. It is preferable to use a resin because of its good moldability. Example of the resin include polycarbonate resins, olefin resins, acrylic resins, epoxy resins, polystyrene resins, polyethylene resins, polypropylene resins, silicone resins, fluorine-based resins, ABS resins, and urethane resins. Of these, polycarbonate resins and olefin resins are particularly preferred because of their processability. The support substrate 12 does not serve as an optical path of the beam 270 and therefore need not have high light transmittance.

The servo layer 18 formed on the support substrate 12 is formed by forming a projection and a depression (a land and a groove) for tracking control on the surface of the support substrate 12 as well as a reflective layer thereon. The servo layer 18 may be formed as a layer of a metal such as Ag so as to function as a light reflecting film. If necessary, a reflective recordable layer may be provided.

The pitch P1 between the adjacent sections of the land 18A or the groove 18B on the servo layer 18 is set to less than 0.74 μm in this embodiment. More specifically, the pitch P1 is set preferably within the range of 0.6 μm to 0.7 μm, and more preferably to about 0.64 μm.

However, the track pitch P2 of the recording marks recorded on the recording and reading layers 14A to 14F is set to one-half (½) the pitch P1 between the adjacent sections of the land 18A or the groove 18B. More specifically, the track pitch P2 of the recording marks coincides with the pitch between the land 18A and the groove 18B. Therefore, the track pitch 22 of the recording marks is set to less than 0.37 μm, preferably within the range of 0.30 μm to 0.35 μm, and more preferably to about 0.32 μm.

Therefore, the recording track pitch 22 of the recording and reading layers 14A to 14F is about 0.32 μm that is compatible with the BD standard. The pitch P1 (about 0.64 μm) between the adjacent sections of the land 18A/groove 18B of the servo layer 18 allows sufficient tracking with the beam 270 in a relatively long red wavelength range. As will be described later in detail, tracking control is performed using both the land 18A and the groove 18B in the present embodiment. Therefore, the track pitch P2 of the recording marks recorded on the recording and reading layers 14A to 14F is about 0.32 μm, which is one-half of the pitch P1 in the servo layer 18. This allows the track pitch P2 of the recording marks on the recording and reading layer group 14 to be reduced without reducing the pitch P1 in the servo layer 18, and the recording capacity can thereby be increased easily.

The spacer layer 17 is formed of a light-transmitting ultraviolet curable acrylic resin, and the thickness thereof is set to 90 μm in this embodiment.

Each of the first to sixth recording and reading layers 14A to 14F stacked on the spacer layer 17 on the side toward the light incident surface 10A has a three-film structure (not shown) having dielectric films stacked on opposite sides of a write once-type recording film. Each of the first to sixth recording and reading layers 14A to 14F has light reflectivity, absorbance, transmittance, and other properties optimized for the beam 170 in the blue wavelength range (short wavelength range) from the first optical system 100 and allows sufficient transmission of the beam 270 in the red wavelength range (long wavelength range) from the second optical system 200. The dielectric films in each recording and reading layer have a basic function of protecting the write once type recording film and also play a role in increasing the differences in optical properties before and after the formation of recording marks.

When the beam 170 is applied, the recording sensitivity is likely to decrease if the energy absorbed by the dielectric films is large. To prevent the reduction in the recording sensitivity, it is preferable to select a material having a low absorption coefficient (k) for the wavelength range of 380 nm to 450 nm (particularly at 405 nm) as the material for the dielectric films. In this embodiment, $TiO_2$ is used as the material for the dielectric films.

The write once type recording film sandwiched between the dielectric films is used to form irreversible recording marks, and the regions in which the recording marks have been formed have a reflectivity for the beam 170 significantly different from that of the other regions (blank regions). The recording and reading of data are thereby achieved. Also the write once type recording film has high transmittance for the tracking beam 270 in the red wavelength range from the second optical system 200.

The write once type recording film is formed mainly of a material containing Bi and O. The write once type recording film functions as an inorganic reactive film, and its reflectivity is largely changed chemically or physically by the heat of a laser beam. Preferred examples of the material for the write once type recording film include materials containing Bi and O as main components and materials containing Bi, M, and O as main components (wherein M is at least one element selected from among Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material for the write once type recording film.

In the above description, the write once type recording film is used for each of the first to sixth recording and reading layers 14A to 14F. However, a phase change recording film that allows repeated recording can be used. In such a case, it is preferable to use SbTeGe as the main components of the phase change recording film.

The intermediate layer group 16 includes first to fifth intermediate layers 16A to 16E that are stacked in that order from the side away from the light incident surface 10A and disposed between the first to sixth recording and reading layers 14A to 14F. Each of the intermediate layers 16A to 16E is formed of an ultraviolet curable acrylic or epoxy resin. The thicknesses of the intermediate layers 16A to 16E are 16 μm for the first intermediate layer 16A, 12 μm for the second intermediate layer 16B, 16 μm for the third intermediate layer 16C, 12 μm for the fourth intermediate layer 16D, and 16 μm for the fifth intermediate later 16E. More specifically, two types of intermediate layers having different thicknesses (16 μm and 12 μm) are stacked alternately. Therefore, the interlayer distances between adjacent ones of the first to sixth recording and reading layers 14A to 14F are set alternately to a first distance (16 μm) and a second distance (12 μm) different from the first distance in sequence from the light incident surface side. The difference between the first and second distances is set to 4 μm. In this manner, interlayer crosstalk is reduced.

As in the intermediate layer group 16, the cover layer 11 is formed of a light-transmitting ultraviolet curable acrylic resin, and the thickness thereof is set to 38 μm.

Since the optical recording medium 10 is configured as described above, the servo layer 18 is positioned at a distance of 0.2 mm (200 μm) from the light incident surface 10A. In the recording and reading layer group 14, the first recording and reading layer 14A, which is farthest from the light incident surface 10A, is positioned at a distance of 0.11 mm (110 μm) from the light incident surface 10A; the second recording and reading layer 14B is positioned at a distance of 94 μm; the third recording and reading layer 14C is positioned at a distance of 82 μm; the fourth recording and reading layer 14D is positioned at a distance of 66 μm; the fifth recording and reading layer 14E is positioned at a distance of 54 μm; and the sixth recording and reading layer 14F, which is closest to the light incident surface 10A, is positioned at a distance of 38 μm from the light incident surface 10A. The total thickness of the recording and reading layer group 14 (the distance from the first recording and reading layer 14A to the sixth recording and reading layer 14F) is 72 μm.

In the optical recording medium 10 in the present embodiment, the servo layer 18 is disposed at a position farther from the light incident surface 10A than the recording and reading layer group 14. In this configuration, the adverse influence of the land 18A and the groove 18B for tracking on the recording and reading beam 170 projected onto the recording and reading layer group 14 can be reduced.

A method of manufacturing the optical recording medium 10 in the present embodiment will next be described.

First, a support substrate 12 having a land and a groove formed thereon is produced by injection molding of a polycarbonate resin and using a metal stamper. Basic information (including the address information of the recording and reading layer group 14, recording conditions such as a recording and reading power, the interlayer distances between or the positions of the recording and reading layers 14A to 14E, and other information) that should be pre-stored during manufacturing of the medium is pre-recorded on the support substrate 12 using the mold for the injection molding. More specifically, a wobble 18W of the land 18A or the groove 18B is used to pre-record the basic information. The method of producing the support substrate 12 is not limited to injection molding, and any other method such as a 2P method may be used.

Next, the servo layer 18 is formed on the surface of the support substrate 12 on which the groove and land have been formed. The servo layer 18 is formed by forming a reflective metal layer by sputtering using a Ag alloy. Then the spacer layer 17 is formed on the servo layer 18. To form the spacer layer 17, for example, a coating of an ultraviolet curable acrylic or epoxy resin having a controlled viscosity is formed by, for example, spin coating and then irradiated with ultraviolet rays to cure the resin. The spacer layer 17 may be formed by applying, instead of the ultraviolet curable resin, a light-transmitting sheet of a light-transmitting resin to the servo layer 18 with, for example, an adhesive.

Next, the first recording and reading layer 14A is formed. More specifically, a dielectric film, a write once type recording film, and another dielectric film are formed in that order by vapor deposition. In particular, sputtering is preferably used. Next, the first intermediate layer 16A is formed on the first recording and reading layer 14A. To form the first intermediate layer 16A, for example, a coating of an ultraviolet curable resin having a controlled viscosity is formed by, for example, spin coating and then irradiated with ultraviolet rays to cure the resin. The above procedure is repeated to sequentially stack the second recording and reading layer 14B, the second intermediate layer 16B, and so on.

After completion of the formation of the sixth recording and reading layer 14F, the cover layer 11 is formed thereon, and the optical recording medium 10 is thereby completed. To form the cover layer 11, for example, a coating of an ultraviolet curable acrylic or epoxy resin having a controlled viscosity is formed by, for example, spin coating and then irradiated with ultraviolet rays to cure the resin. In the present embodiment, the manufacturing method described above is used. However, the present invention is not limited to the manufacturing method described above, and other manufacturing techniques may be used.

Next, a description will be given of a procedure of recording and reading information on/from the optical recording medium 10 of the present embodiment using the optical pickup 90.

Figure 3A:
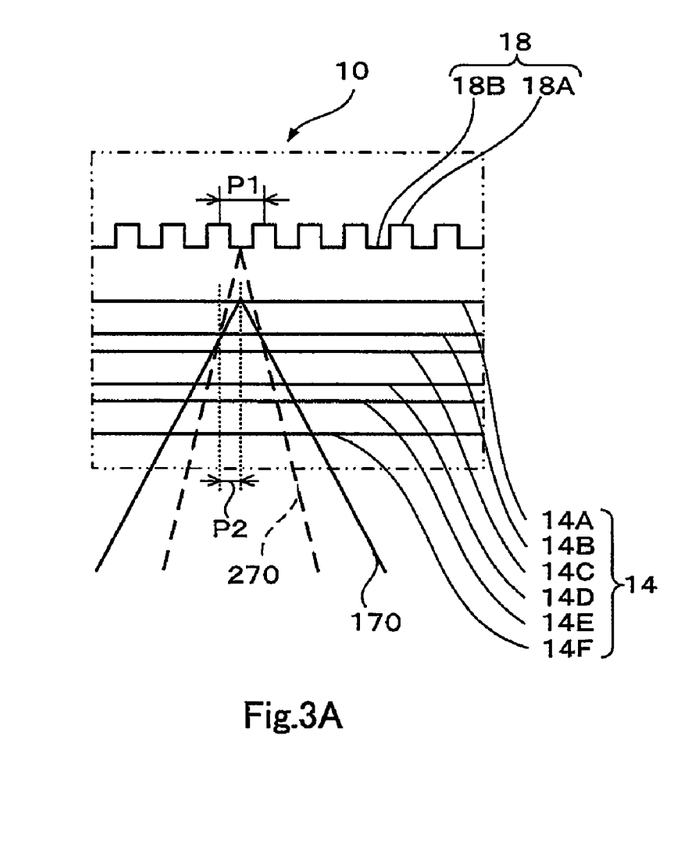
FIGS. 3A and 3B are enlarged cross-sectional views illustrating the stacking structure of the optical recording medium and a recording procedure.
Figure 3B:
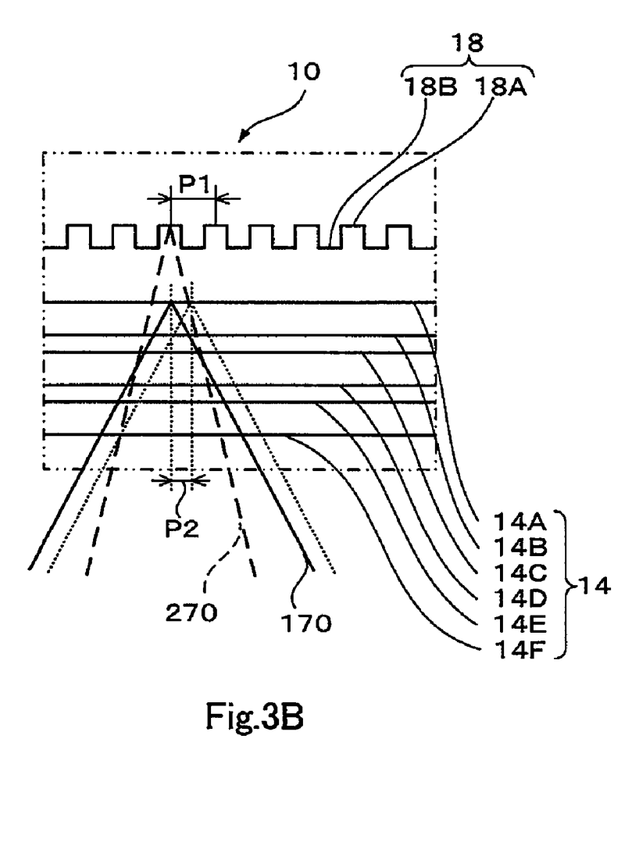

To record information on the first recording and reading layer 14A of the first optical recording medium 10, first, the servo layer 18 is irradiated with the beam 270 in the red wavelength range from the second optical system 200 to perform tracking. More specifically, the spot of the beam 270 is projected onto the land 18A and the groove 18B on the servo layer 18 to perform tracking, as shown in FIGS. 3A and 3B. Simultaneously with the above operation, the first recording and reading layer 14A is irradiated with the recording beam 170 in the blue wavelength range from the first optical system 100. The basic specifications of the optical recording medium 100 and the information about the number of stacked layers in the information recording and reading layer group 14 have been recorded as recorded pits or in a BCA (burst cutting area) on the servo layer 18 and are read each time before tracking is started. In the present embodiment, the basic information of the optical recording medium includes the position of the servo layer, the positions of the first to sixth recording and reading layers 14A to 14F, and the rule of the interlayer distances in the recording and reading layer group.

Therefore, information is recorded on the first recording and reading layer 14A while both the land 18A and the groove 18B are tracked. The track pitch P2 of recording marks formed on the first recording and reading layer 14A therefore coincides with the pitch between the land 18A and the groove 18B.

The formation of recording marks while both the land 18A and the groove 18B are tracked will be described in more detail. For convenience, recording marks formed while the groove 18B is tracked are defined as groove-side recording marks, and recording marks formed while the land 18A is tracked are defined as land-side recording marks. For example, as shown in FIG. 3A, the beam 270 is first projected onto the groove 18B on the servo layer 18 to perform tracking, and groove-side recording marks are formed on the recording and reading layer 14A during one turn of the disc. Then as shown in FIG. 3B, the beam 270 is moved to the adjacent land 18A to perform tracking, and land-side recording marks are formed. After land-side recording marks are recorded during one turn of the disc, groove-side recording marks are recorded during one turn of the disc while the adjacent groove 18B is tracked in a manner similar to that shown in FIG. 3A. The above operation is repeated to record information on the recording and reading layer 14A while both the land 18A and the groove 18B on the servo layer 18 are tracked. Therefore, the track pitch P2 of the recording marks recorded on the recording and reading layer 14A, i.e., the distance P2 between the land-side recording marks and the groove-side recording marks, is one-half of the pitch P1 between the adjacent sections of the land 18A or the groove 18B on the servo layer 18.

After completion of the recording of information, the present additional information (including the address information, content information, and other information of the recording) is recorded on the servo layer 18 to complete the process. The recording on the servo layer 18 is performed with the red beam 270 while this red beam 270 is used to perform tracking. Although not shown in the figures, tracking may be performed by irradiating the servo layer with the blue beam 170. In this case, control information may be recorded on the servo layer with this blue beam 170. Any one of the land 18A and the groove 18B may be used to record the control information. However, both the land 18A and the groove 18B may be used.

If the servo layer 18 has no recording layer, the additional information may be recorded on the first recording and reading layer 14A that is farthest from the light incident surface 10A or the sixth recording and reading layer 14F that is closest to the light incident surface 10A to complete the process.

To read the information recorded on, for example, the first recording and reading layer 14A, first, the servo layer 18 is read using the beam 270 from the second optical system 200 to read out the basic specifications described above and the additional information (for example, the information of the contents recorded on the first recording and reading layer 14A and other information of the recording). Then the read information is used to access to a predetermined address in the first recording and reading layer 19A utilizing the beam 170 from the first optical system 100, and reading is thereby performed. Since it is apparent that the information has already been recorded on the first recording and reading layer 14A, tracking during reading can be performed using the recording marks for the information. Therefore, when the contents on the first recording and reading layer 14A are being read, the beam 270 from the second optical system 200 can be eliminated.

In the optical recording medium 10 and the optical recording and reading method in the present embodiment described above, while the long-wavelength servo beam 270 is used to track both the land 18A and the groove 18B of the servo layer 18, recording marks are formed on the recording and reading layer group 14 using the recording and reading beam 170. Therefore, recording on the recording and reading layer group 14 can be performed at the track pitch P2 which is one-half of the pitch P1 in the servo layer 18.

In the above configuration, even when the wavelength of the beam 270 used for the servo layer 18 is set within the range of 630 nm to 680 nm which is in the red wavelength range, high density recording can be achieved by setting the wavelength of the recording and reading beam 170 within the range of 380 nm to 450 nm which is in the blue wavelength range.

In the conventional DVD standard in which a beam 270 in the red wavelength range is used, the track pitch is set to 0.74 μm to achieve stable recording and reading. However, in the present embodiment, it is sufficient that tracking using the land 18A and the groove 18B can be performed with the beam 270. According to the examination by the present inventors, the track pitch P1 can be further reduced.

For example, it is preferable to set the track pitch P1 to 0.6 μm to 0.7 μm (more specifically about 0.64 μm). This allows the track pitch P2 in the recording and reading layer group 14 to be set to 0.30 μm to 0.35 μm (more specifically about 0.32 μm) to conform to the BD standard.

In particular, when the track pitch in the servo layer 18 is set to 0.64 μm, existing products for the DVD standard can be used as the second optical system 200 with almost no change. Since the track pitch in the recording and reading layer group 14 is 0.32 μm, existing products for the BD standard can be used as the first optical system 100 with almost no change. Therefore, no additional development expense is required for the optical pickup 90, and existing parts can be effectively used for the optical recording medium of the present invention.

In commercially available DVD/BD compatible optical pickups, light sources for a red beam 270 for DVD recording and reading and a blue beam 170 for BD recording and reading are installed. Therefore, hardware products for such conventional DVD/BD compatible optical pickups can be effectively used for the optical pickup 90 used in the present embodiment, and this can advantageously reduce development costs significantly.

In the present embodiment, the track pitch P1 in the servo layer 18 is set to 0.64 μm so that the track pitch P2 in the recording and reading layer group 14 conforms to the BD standard (0.32 μm). However, the track pitch P1 in the servo layer 18 may be set to 0.74 μm, which is used in the conventional DVD standard. In this case, the track pitch P2 in the recording and reading layer group 14 becomes 0.37 μm. In this configuration, a stamper for DVDs can be used as the stamper used to form the servo layer 18 (the support substrate 12) during manufacturing of the optical recording medium 10 without extensive modifications, and therefore the manufacturing cost can be further reduced.

In the present embodiment, the blue wavelength beam 170 used for recording is projected onto recording marks to perform tracking directly during reading. This can improve the efficiency of reading.

In the present embodiment, the servo layer 18 is disposed farther from the light incident surface than the recording and reading layer group 14 and is irradiated with the red beam 270 passing through the recording and reading layer group 14 to perform tracking. In this configuration, it is only required to pre-form the land 18A and the groove 18B on the support substrate 12 when the optical recording medium 10 is produced, and the manufacturing cost can thereby be reduced significantly.

In the description of the optical recording medium 10 in the present embodiment, the servo layer 18 is disposed farther from the light incident surface 10A than the recording and reading layer group 14, but the invention is not limited thereto. In the above description, the number of the recording and reading layers in the recording and reading layer group 14 is six or more, but the invention is not limited thereto.

Figure 4:
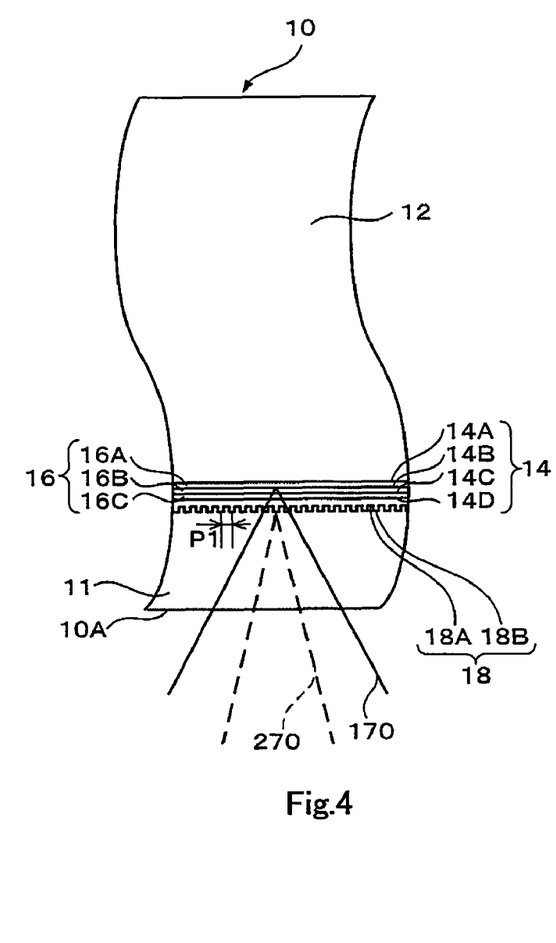
FIG. 4 is a cross-sectional view illustrating the stacking structure of the optical recording medium according to another embodiment of the present invention.

FIG. 4 shows an optical recording medium 10 in another embodiment. In this optical recording medium 10, a servo layer 18 is disposed closer to a light incident surface 10A than a recording and reading layer group 14 having a four-layer structure. In this optical recording medium 10, the servo layer 18 has wavelength selectivity that causes the layer 18 to reflect the long-wavelength red beam 270 and to transmit the short-wavelength blue beam 170. Therefore, recording and reading can be performed by irradiating the recording and reading layer group 14 with the recording and reading blue beam 170 passing through the servo layer 18.

In the above configuration, since the servo layer 18 is disposed closer to the light incident surface 10A than the previous case, the accuracy of tracking can be improved. The servo layer 18 in the optical recording medium 10 is formed by stamping using the 2P method. Since the stamper used is similar to that used for the DVD standard, the manufacturing cost can be reduced.

In the present embodiments, two types of interlayer distances (16 μm and 12 μm) are set alternately in the recording and reading layer group, but the invention is not limited thereto. A combination of three or more different interlayer distances may be used.

In the present embodiments, the servo layer 18 is disposed at a distance of 0.2 mm from the light incident surface 10A. However, for example, the servo layer 18 may be disposed at a distance of 0.6 mm from the light incident surface 10A. The servo layer 18 may be disposed at a distance less than 0.4 mm from the light incident surface 10A. The tracking of the servo layer 18 and recording thereon may be performed using the blue beam 170. The use of the blue beam 170 allows a reduction in the size of recording marks. Therefore, the recording marks for the control information and other information can be formed on the land 18A and the groove 18B of the servo layer 18 with a sufficient margin.

The interlayer distance between the servo layer 18 and the first recording and reading layer 14A adjacent thereto may be equal to any one of the interlayer distances (the first distance 16 μm or the second distance 12 μm) in the recording and reading layer group 14. With this configuration, the first optical system 100 can easily estimate the position of the servo layer 18 and therefore can use the servo layer 18 as one layer involved in the recording and reading layer group 14.

In the present embodiments, the servo layer is disposed at a position farther from the light incident surface than the recording and reading layer group, but the invention is not limited thereto. The servo layer may be disposed closer to the light incident surface than the recording and reading layer group.

In the present embodiments, the beam 270 having a longer wavelength is in the red wavelength range, and the beam 170 having a shorter wavelength is in the blue wavelength range. However, the invention is not limited thereto. For example, a beam having a longer wavelength in the blue wavelength range may be used as the beam 270, whereas the beam having a shorter wavelength in the blue wavelength range may be used as the beam 170. In such a case, if the track pitch in the servo layer 18 is set to 0.6 μm or less, information can be recorded on the recording and reading layers at a pitch of 0.3 μm or less. Therefore, according to the present invention, a recording pitch smaller than that limited by conventional tracking control can be achieved.

The optical recording medium and the optical recording and reading method according to the present invention are applicable to various optical recording media including a servo layer and recording and reading layers.

The entire disclosure of Japanese Patent Application No. 2010-035811 filed on Feb. 22, 2010 including specification, claims, drawings, and summary are incorporated herein by reference in its entirety.

What is claimed is:

1. An optical recording medium comprising: a plurality of recording and reading layers having a flat structure with no projection and depression for tracking control; and a servo layer having a groove and a land for tracking control formed thereon, wherein: information is recorded on the plurality of recording and reading layers while tracking control is performed using the servo layer;
   the groove and the land on the servo layer are tracking-controlled with a long-wavelength servo beam;
   the information is recorded on the plurality of recording and reading layers with a recording and reading beam having a wavelength shorter than a wavelength of the servo beam;
   groove-side recording marks are formed on the recording and reading layer with the recording and reading beam while the long-wavelength servo beam is projected onto the groove on the servo layer to perform tracking control;
   land-side recording marks are formed on the recording and reading layer with the recording and reading beam while the long-wavelength servo beam is projected onto the land on the servo layer to perform tracking control; and
   a track pitch between the groove-side recording marks and the land-side recording marks formed on the plurality of recording and reading layers coincides with a pitch between the groove and the land on the servo layer.

2. The optical recording medium according to claim 1, wherein:
   the servo layer is disposed farther from a light incident surface of the optical recording medium than the plurality of recording and reading layers; and
   the recording and reading layers have properties that allow transmission of the servo beam.

3. The optical recording medium according to claim 1, wherein
   the servo layer is disposed closer to a light incident surface of the optical recording medium than the plurality of recording and reading layers, and has properties that allow transmission of the recording and reading beam.

4. The optical recording medium according to claim 1, wherein:
   a wavelength of the servo beam is in the range of 630 nm to 680 nm; and
   a wavelength of the recording and reading beam is in the range of 380 nm to 450 nm.

5. The optical recording medium according to claim 1, wherein:
   a pitch between adjacent sections of the groove or a pitch between adjacent sections of the land is less than 0.74 μm; and
   the track pitch between the groove-side recording marks and the land-side recording marks formed on the plurality of recording and reading layers is less than 0.37 μm.

6. The optical recording medium according to claim 5, wherein:
   the pitch between the adjacent sections of the groove or the pitch between the adjacent sections of the land is in the range of 0.6 μm to 0.7 μm; and
   the track pitch between the groove-side recording marks and the land-side recording marks formed on the plurality of recording and reading layers is in the range of 0.30 μm to 0.35 μm.

7. The optical recording medium according to claim 1, wherein the servo layer is disposed at a distance less than 0.6 mm from the light incident surface.

8. The optical recording medium according to claim 7, wherein the servo layer is disposed at a distance less than 0.4 mm from the light incident surface.

9. The optical recording medium according to claim 1, wherein an interlayer distance between the servo layer and a recording and reading layer that is adjacent to the servo layer among the plurality of recording and reading layers is equal to any one of interlayer distances between the plurality of recording and reading layers.

10. The optical recording medium according to claim 1, wherein the recording and reading layers include six or more recording and reading layers.

11. The optical recording medium according to claim 1, wherein interlayer distances between the plurality of recording and reading layers are set alternately to a first distance and a second distance different from the first distance.

12. An optical recording and reading method of recording information on an optical recording medium, the optical recording medium including a plurality of recording and reading layers having a flat structure with no projection and depression for tracking control and a servo layer having a groove and a land for tracking control formed thereon, the method comprising:
    forming recording marks on the plurality of recording and reading layers with a recording and reading beam having a wavelength shorter than a wavelength of the servo beam while tracking control is performed using both the groove and the land on the servo layer that are tracked with a long-wavelength servo beam,
    forming groove-side recording marks on the recording and reading layer with the recording and reading beam while the long-wavelength servo beam is projected onto the groove on the servo layer to perform tracking control;
    forming land-side recording marks on the recording and reading layer with the recording and reading beam while the long-wavelength servo beam is projected onto the land on the servo layer to perform tracking control;
    so that a track pitch between the groove-side recording marks and the land-side recording marks coincides with a pitch between the groove and the land.

13. The optical recording and reading method according to claim 12, wherein, when reading is performed by irradiating the recording marks with the recording and reading beam, tracking control is performed using reflected light of the recording and reading beam.

14. The optical recording and reading method according to claim 12, wherein:
the servo layer is disposed farther from a light incident surface of the optical recording medium than the plurality of recording and reading layers, and the plurality of recording and reading layers have properties that allow transmission of the servo beam; and the servo layer is irradiated with the servo beam passing through the plurality of recording and reading layers to perform tracking control.

15. The optical recording and reading method according to claim 12, wherein:
the servo layer is disposed closer to a light incident surface of the optical recording medium than the plurality of recording and reading layers and has properties that allow transmission of the recording and reading beam; and
each of the plurality of recording and reading layers is irradiated with the recording and reading beam passing through the servo layer to perform recording or reading.

16. The optical recording and reading method according to claim 12, wherein:
a wavelength of the servo beam is in the range of 630 nm to 680 nm; and
a wavelength of the recording and reading beam is in the range of 380 nm to 450 nm.

17. The optical recording and reading method according to claim 12, wherein a pitch between adjacent sections of the groove or a pitch between adjacent sections of the land is set to less than 0.74 µm, so that the track pitch between the groove-side recording marks and the land-side recording marks formed on the plurality of recording and reading layers is set to less than 0.37 µm.

18. The optical recording and reading method according to claim 17, wherein the pitch between the adjacent sections of the groove or the pitch between the adjacent sections of the land is set in the range of 0.6 µm to 0.7 µm, so that the track pitch between the groove-side recording marks and the land-side recording marks is set in the range of 0.3 µm to 0.35 µm.

19. An optical recording and reading method of recording information on an optical recording medium, the optical recording medium including a plurality of recording and reading layers having a flat structure with no projection and depression for tracking control and a servo layer having a groove and a land for tracking control formed thereon, the method comprising:
forming recording marks on the plurality of recording and reading layers with a recording and reading beam having a wavelength shorter than a wavelength of the servo beam while tracking control is performed using both the groove and the land on the servo layer that are tracked with a long-wavelength servo beam, so that a track pitch of the recording marks coincides with a pitch between the groove and the land, wherein information is recorded on the servo layer with the recording and reading beam.

20. The optical recording and reading method according to claim 12, wherein the servo layer is disposed at a distance less than 0.4 mm from a light incident surface of the optical recording medium.

* * * * *